March 31, 1964    E. W. GLATFELTER ETAL    3,127,133
PICKUP SYSTEM
Filed June 20, 1963      7 Sheets-Sheet 1
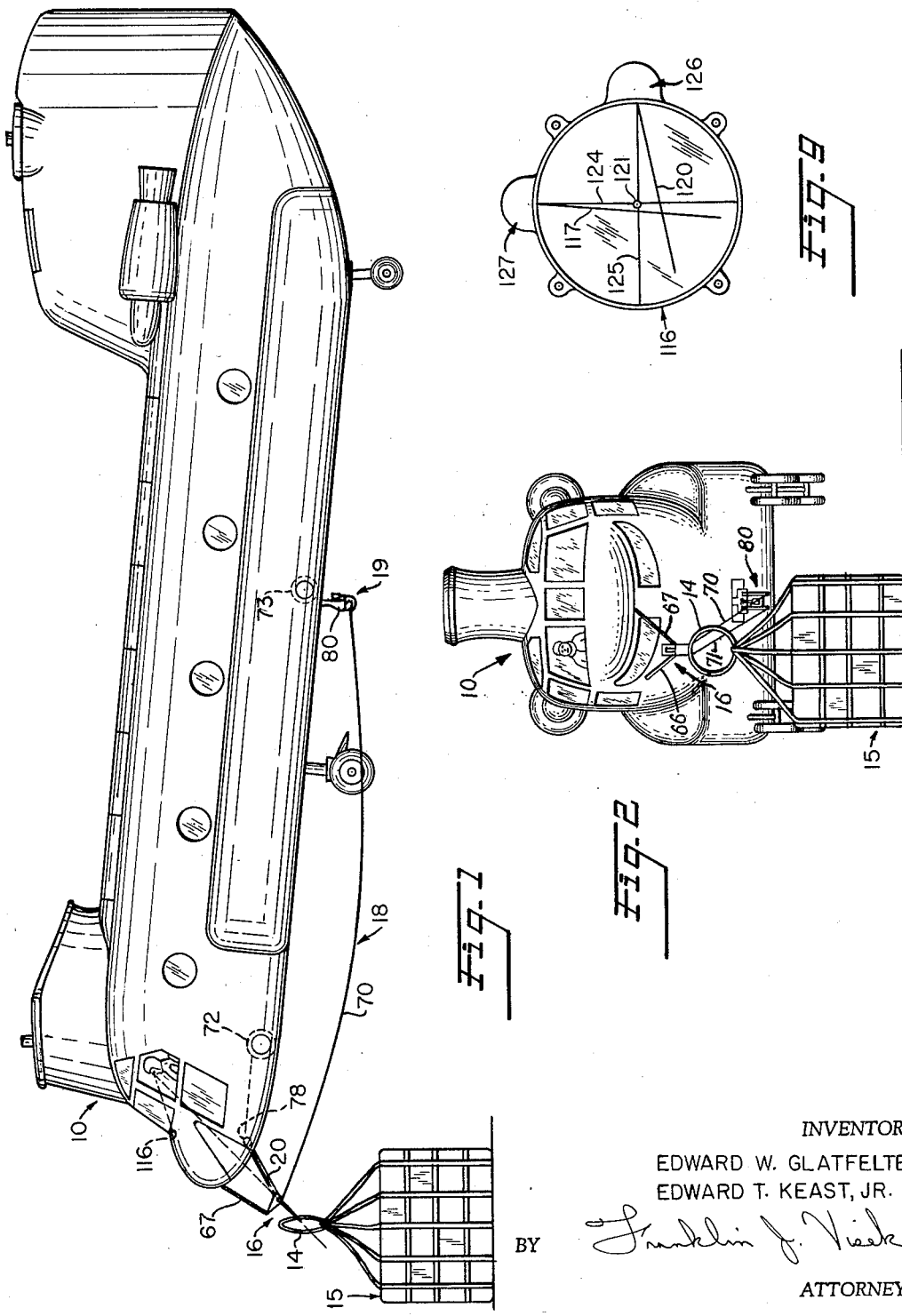
INVENTORS
EDWARD W. GLATFELTER
EDWARD T. KEAST, JR.
BY *Franklin J. Vick*
ATTORNEY March 31, 1964  E. W. GLATFELTER ETAL  3,127,133
PICKUP SYSTEM
Filed June 20, 1963  7 Sheets-Sheet 2
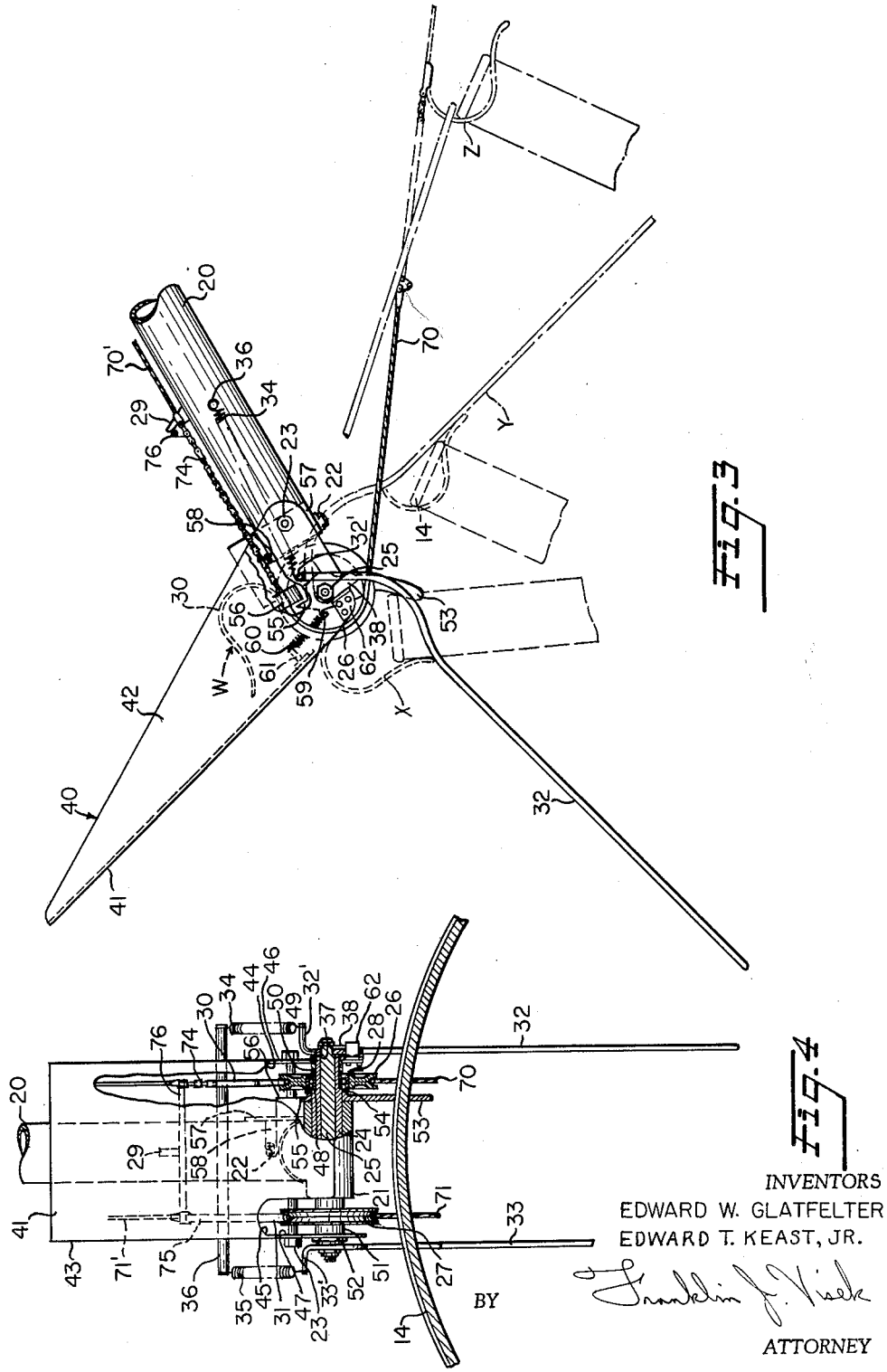
INVENTORS
EDWARD W. GLATFELTER
EDWARD T. KEAST, JR.
BY
ATTORNEY March 31, 1964     E. W. GLATFELTER ETAL     3,127,133
PICKUP SYSTEM Filed June 20, 1963     7 Sheets-Sheet 3

INVENTORS
EDWARD W. GLATFELTER
EDWARD T. KEAST, JR.
BY
*Franklin J. Visk*
ATTORNEY

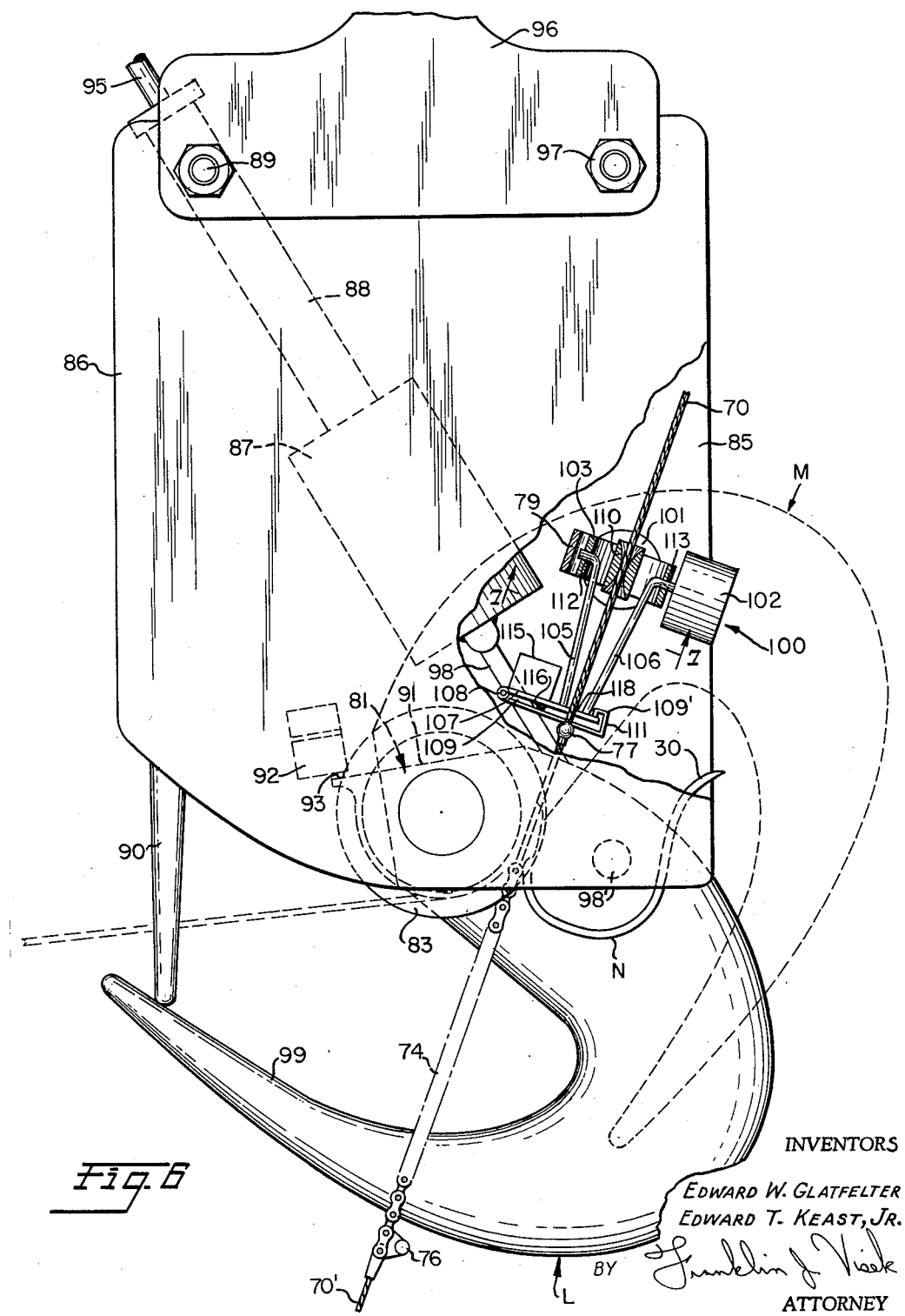

March 31, 1964 E. W. GLATFELTER ETAL 3,127,133
PICKUP SYSTEM
Filed June 20, 1963 7 Sheets-Sheet 5
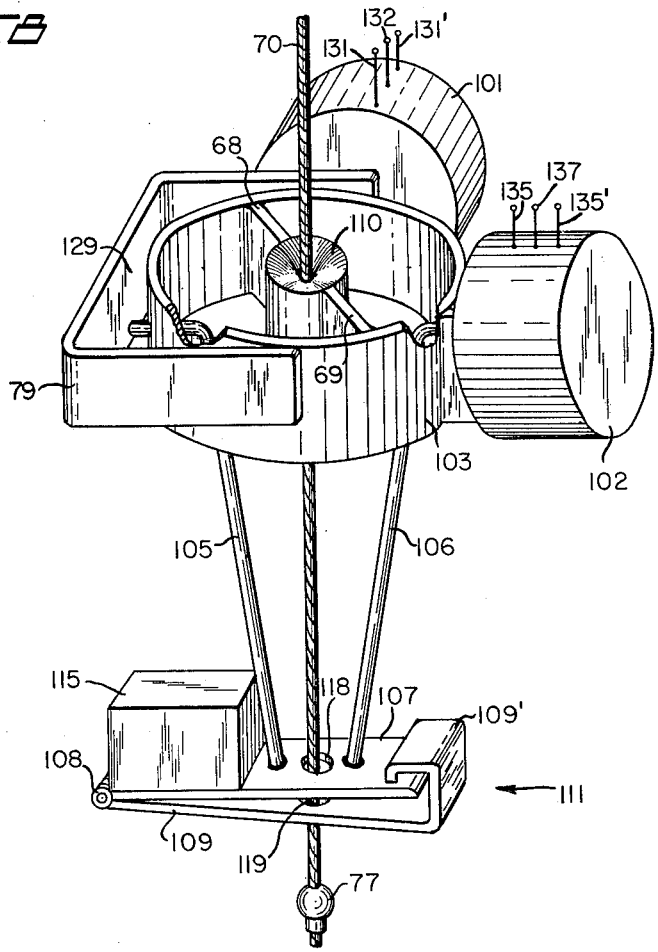
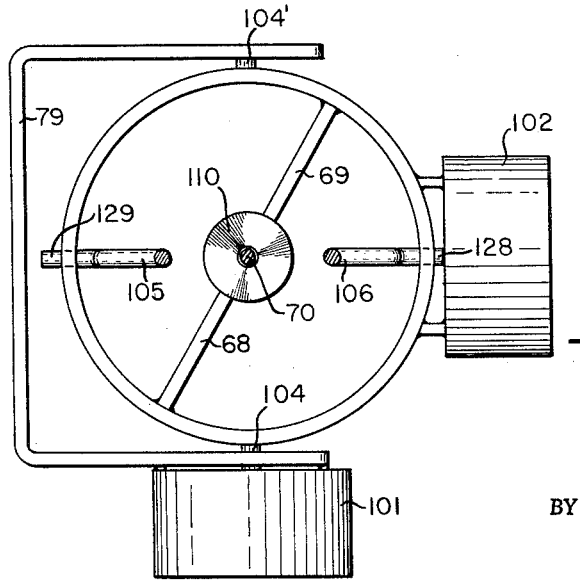
INVENTORS
EDWARD W. GLATFELTER
EDWARD T. KEAST, JR.
BY Franklin J. Vick
ATTORNEY March 31, 1964 E. W. GLATFELTER ETAL 3,127,133
PICKUP SYSTEM
Filed June 20, 1963 7 Sheets-Sheet 6

INVENTORS
EDWARD W. GLATFELTER
BY EDWARD T. KEAST, JR.
ATTORNEY

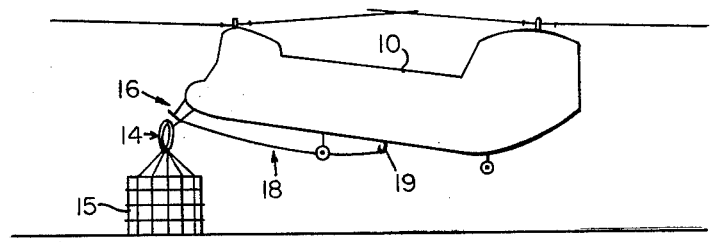
Fig. 12
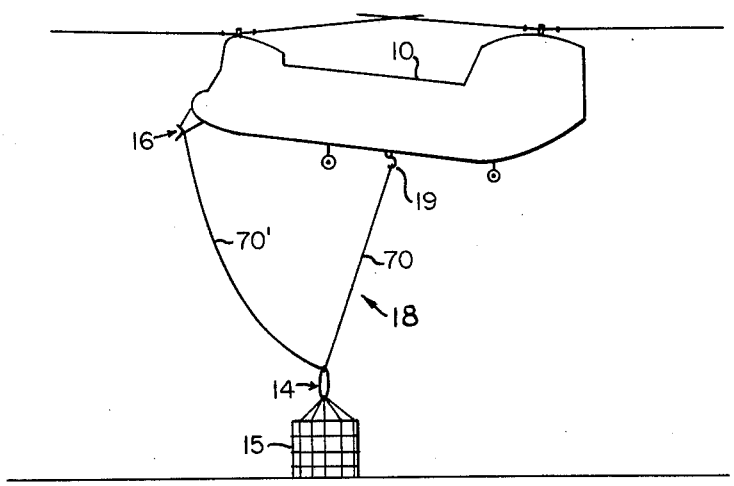
Fig. 13
Fig. 14
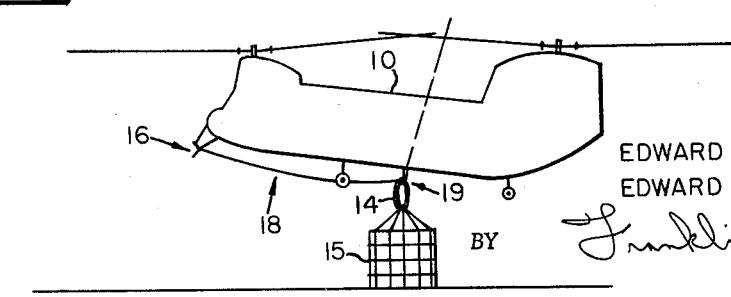

United States Patent Office 3,127,133
Patented Mar. 31, 1964

3,127,133
PICKUP SYSTEM
Edward W. Glatfelter, Newtown Square, and Edward T. Keast, Jr., Drexel Hill, Pa., assignors to The Boeing Company, Seattle, Wash., a corporation of Delaware
Filed June 20, 1963, Ser. No. 289,180
31 Claims. (Cl. 244—77)

This invention relates to a pickup system and, more particularly, to a pickup device associated with an aircraft such as the hovering-type aircraft to permit cargo pickups while the aircraft is in flight.

The development of the hovering-type aircraft and the general advance in the state of the art thereof has made a considerable impact upon aeronautical technology and has increased the uses of aircraft both in the military and civilian applications thereof. Its unique characteristics and capabilities of movements in all directions and hovering and, particularly, its ability to make vertical ascents and descents have created a myriad of uses for this aircraft. Concomitantly, this type of aircraft has permitted operations unavailable prior to its development.

An example of one of the many useful applications of the hovering-type aircraft is its ability to hover directly over a cargo located on the ground, on a building, or on the deck of a ship and to be able to pick up this cargo while remaining airborne. However, the means heretofore employed by hovering-type aircraft for cargo pickups were often crude and inefficient. Examples of such means are the dropping of a free line from the aircraft to be attached to the cargo by a ground crew, or attempting to snag cargo by means of a free-swinging hook. Obviously, both of these methods are inefficient, time consuming and hazardous.

The present invention is directed to a device in conjunction with a hovering-type aircraft for permitting pilot-controlled cargo pickups wherein the cargo is first engaged in the view of the pilot and under full control thereof by means of a unique engaging system, which is transitory in nature. After the cargo is engaged by the transitory engaging system, the engagement is maintained until the cargo is grasped by a cargo-carrying member mounted on the aircraft. Additionally, since engagement by the transitory engaging system is by a resilient hook and since the cargo-carrying member may be made load releasable, the pickup system of this invention provides an abort capability during the entire pickup operation.

The pickup system of this invention further includes a guidance system which provides for the accurate transfer of the load engaged by the transitory engaging system to the cargo-carrying member, which is not normally in the pilot's view. This guidance system provides the pilot with complete and accurate information concerning the relative positions of the aircraft and the load that is needed for efficiently carrying forth the pickup operation of this invention. That is, the pickup system of this invention enables the pilot to make corrections in aircraft movements during pickup operations without having the cargo-carrying member or ground load in view. From the foregoing it may be clearly understood that the invention includes an efficient cargo pickup system which provides for positive and accurate pickup of ground loads and which may be operated by only one man, the pilot.

Accordingly, an object of the present invention is the provision of a system for engaging a ground load with an airborne transitory engaging system in the view of and under the control of a pilot of an airborne aircraft.

Another object of the invention is to provide an airborne transitory engaging system for grasping a ground load in the view of the pilot and thereafter provide for the transfer of the load to the aircraft's cargo-carrying member, which is not normally in the view of the pilot.

Still another object of the present invention is the provision of an aircraft pickup system for grasping a load in the view of a pilot of an airborne aircraft and transferring the load to the aircraft's load-carrying member which is not normally in the view of the pilot by providing the pilot with complete and accurate information concerning the position of the aircraft with respect to the ground.

A further object of the present invention is to provide an aircraft pickup system embodying means for initially and positively engaging a cargo-pickup member and further for effecting a transition of the engagement with the cargo-pickup member from a temporary connection to an essentially permanent cargo-carrying member.

An additional object of the present invention is the provision of an aircraft cargo-pickup system wherein an initial transitory connection is made with a cargo-pickup member, and the cargo is maintained in a stabilized condition while engagement thereof is transferred to a cargo-carrying member on the aircraft.

Still another object of the invention is to provide a guidance system for providing the complete and accurate information to enable maintenance of an airborne aircraft's desired positional relationship with respect to a ground load during the pickup operation.

An additional object of the invention is the provision of a heretofore unknown method of grasping a ground load with an airborne aircraft by grasping a load with a transitory member, guiding movements of the aircraft to enable movement along a preselected path and transfer of the ground load to the aircraft's cargo-carrying member.

Other objects of this invention will be readily perceived from the following description, drawings, and claims:

This invention relates to a pickup system comprising a movable platform having contact means mounted on the platform for contacting a load. Additionally, load-engagement means are mounted on the movable platform and in spaced relation to the contact means, and movement means are mounted on the movable platform and have transitory means mounted thereon. The movement means are responsive to selected contact of the load by the contact means for moving the transitory means into engagement with the load and for moving the transitory means with respect to the movable platform between a first position adjacent the contact means and a second position adjacent the engagement means. Additionally, the engagement means are responsive to movement of the transitory means to the second position for engaging the load.

This invention also relates to a pickup system in combination with an aircraft. The pickup system comprises contact means mounted on the aircraft for contacting a load, engagement means mounted on the aircraft in spaced relation to the contact means, and movement means mounted on the aircraft and having transitory means mounted thereon. The movement means are responsive to selected contact of the contact means with the load to move the transitory means into engagement with the load and for movement of the transitory means with respect to the aircraft between a first position adjacent the contact means and a second position adjacent the engagement means. Additionally, the second engagement means are responsive to movement of the transitory means to the second position for engaging the load.

Additionally, this invention relates to a pickup system in combination with an aircraft wherein the pickup system comprises contact means mounted on the aircraft for contacting a load, engagement means mounted on the aircraft in spaced relation to the contact means, and movement means mounted on the aircraft having transitory means including load-grasping means mounted thereon.

The movement means are responsive to selected contact of the contact means with the load to move the transitory means and the load-grasping means thereon into engagement with the load and for movement of the transitory means with respect to the aircraft between a first position adjacent the contact means and a second position adjacent the engagement means. The engagement means are responsive to movement of the transitory means to the second position for engaging the load. Additionally, control means are mounted on the aircraft and have a first control portion mounted in juxtaposed relationship to at least a portion of the movement means and are responsive to movements thereof for controlling movements of the aircraft with respect to the load and to position the aircraft for engagement of the load by the engagement means.

This invention further relates to a guidance system mounted on an aircraft for guiding an aircraft into juxtaposed relationship with a ground load. The guidance system comprises connecting means connecting the aircraft to the load and tension means mounted on the aircraft for receiving the connecting means as the aircraft approaches the ground load. Additionally, control means including sensing means are included for sensing the angular relationship of the aircraft with respect to the connecting means connected between the tension means and the ground load. Further, the guidance system employs indicating means responsive to the sensing means for indicating the spacial relationship of the aircraft with respect to the connecting means.

This invention also relates to a method of grasping a ground load with a flying vehicle comprising the steps of flying the vehicle into contact with the ground load, grasping the ground load by flexible and extensible means mounted on the vehicle, and gaining altitude to a position of predetermined relationship of the vehicle to the ground load. Additionally, the method of this invention includes the steps of reapproaching the ground load with the vehicle along the length of the flexible and extensible means when the flexible and extensible means are maintained substantially under tension between the vehicle and the ground load, and contacting and grasping the ground load with cargo-engagement means mounted on the vehicle for relocation of the ground load.

The attached drawings illustrate a preferred embodiment of the invention in which:

FIGURE 1 is an enlarged side elevational view of an aircraft employing the pickup system of this invention;

FIGURE 2 is a front elevational view of FIGURE 1 showing the relationship of the aircraft to the cargo upon initial approach and contact;

FIGURE 3 is an enlarged fragmentary side elevational view of the guide-engaging means and resilient hook means showing in phantom lines a series of movements of the resilient hook means;

FIGURE 4 is an enlarged front elevational view of the forward guide-engaging means and further showing the mounting of the dual cables, resilient hooks, and associated structure;

FIGURES 5 and 6 are, respectively, front and side elevational views of the cargo-carrying hook with a portion of the associated guidance system for indicating the spacial relationship of the aircraft to a ground load and showing a sequence of the operation of the device in phantom lines;

FIGURE 7 is a partial bottom sectional view of a part of the guidance system of the invention taken along line 7—7 of FIGURE 6;

FIGURE 8 is a perspective view of the guidance portion partially illustrated in FIGURE 7 with associated structure;

FIGURE 9 is a front elevational view of the cockpit-mounted indicator for indicating the spacial relationship of the aircraft to the cargo to be picked up;

FIGURE 12 is a side elevational view of an aircraft having the pickup system of this invention thereon and showing the aircraft on its approach for initial engagement with a cargo;

FIGURE 13 is a side elevational view similar to FIGURE 12 but showing an intermediate step in the cargo pickup operation; and FIGURE 14 is a side elevational view similar to FIGURE 12 but showing the relationship of the aircraft and cargo as the cargo is engaged by the cargo-carrying means mounted on the aircraft.

Figure 5:
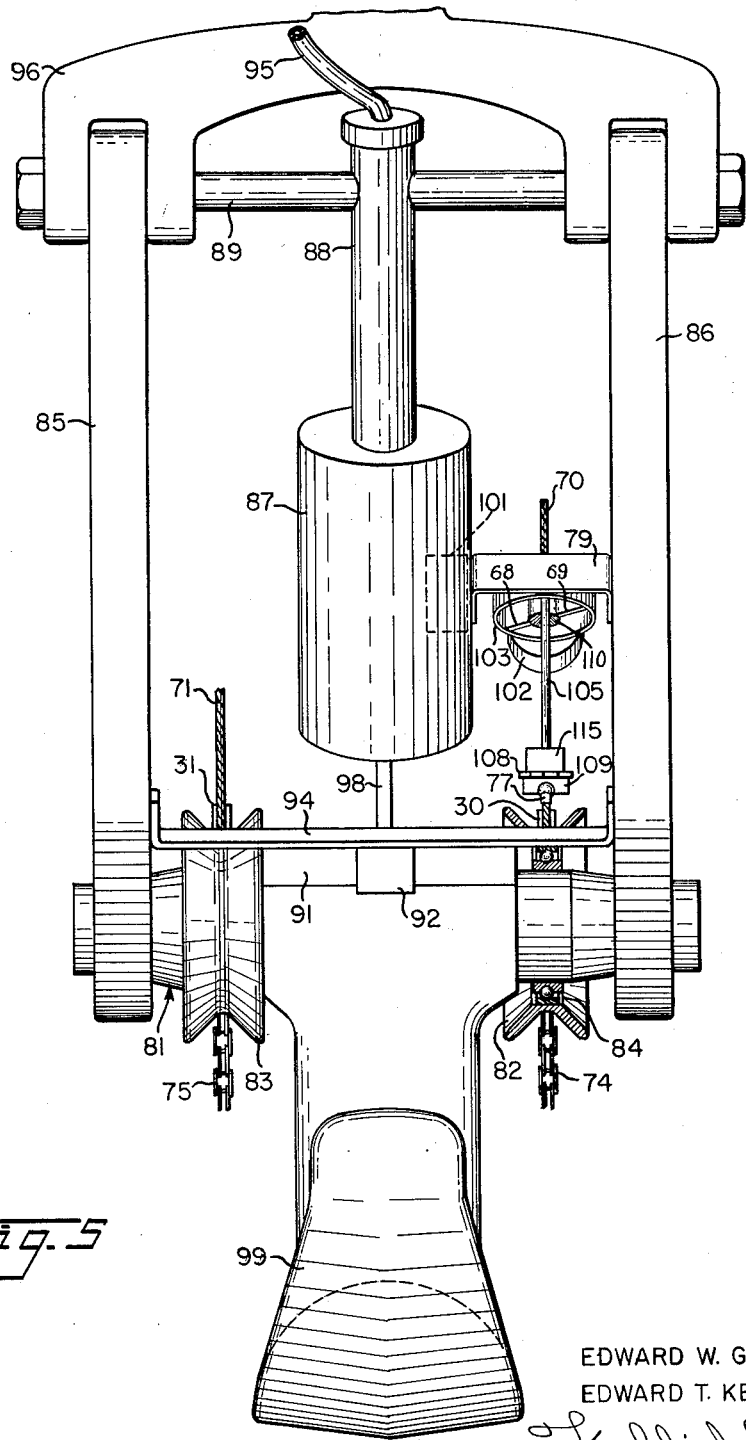

Referring to the drawings and particularly FIGURES 1 and 2, there is shown an aircraft 10, a ground-located cargo 15, and a target ring 14 fixedly secured to and mounted in upstanding relation with respect to the cargo 15. The pickup system of the present invention, which is associated with the aircraft 10, is generally identifiable by three basic parts or assemblies. That is, the pickup system comprises a guide-engaging assembly or contact means 16, a movement assembly 18, and a cargo-carrying assembly 19. However, the pickup system of the present invention also includes a control or guidance system for controlling movement of the aircraft.

The guide-engaging assembly 16 is mounted on the forward portion of the aircraft 10 and initially serves to guide the aircraft 10 to the target ring 14 for engagement of the ring 14 by resilient hooks or transitory engaging and grasping devices 30 and 31 (see FIGURES 3 and 4). The movement assembly 18, which interconnects the guide-engaging assembly 16 and the cargo-carrying or hook assembly 19, includes cables that serve as transitory means for carrying the transitory resilient hooks until the ring 14 is grasped by a cargo-carrying hook or engagement means 80. The movement assembly 18 includes a dual cable and chain system interconnected between a forward constant-tension device 72 and a rear motor-driven dual-tension drum 73. It should be understood that the forward constant-tension device may take various forms. That is, for example, it may be a constant-tension spring device or a motor-driven drum. However, for purposes of simplification, it is hereinafter referred to as constant-tension drum 72.

The operation of the pickup system may be broadly understood by reference to FIGURES 12 to 14. Initially, as seen in FIGURE 12, the aircraft 10 hovers close to and in line with the ring 14. Thereafter, the aircraft 10 flies forward and, after the ring 14 is in position, the resilient hooks 30 and 31 of the movement assembly grasp the target ring 14.

Once the target ring 14 is grasped by the resilient hooks 30 and 31, the aircraft 10 climbs approximately 20 or 30 feet to hover over the cargo 15 (see FIGURE 13). Then the aircraft 10 lowers itself in accordance with a guidance or control system to maintain a proper descent path until the target ring 14 is grasped by the cargo-carrying hook 80 (see FIGURE 14). Thereafter, the movement assembly 18 automatically returns to the position in which it was prior to grasping the target ring 14.

The guide-engaging assembly 16 may be best understood by reference to FIGURES 3 and 4. The guide-engaging assembly 16 is connected to the aircraft 10 through a main support member 20. The main support member 20, which is a hollow shaft, includes a T-shaped member 21 inserted in its outer extremity and mounted therein by perpendicularly disposed fasteners such as bolts 22 and 23. The T-shaped member 21 has a bore extending transverse to the longitudinal axis of the support member 20 for receiving a lateral support member 24 in fixed relationship thereto. A shaft 25 is rotatably mounted within a bore in the lateral support member 24 for rotation with respect thereto. As clearly shown in FIGURE 4, the lateral support member 24 extends beyond the extremities of the bore in the T-shaped member 21, and the shaft 25 extends beyond the extremities of the bore in the lateral support member 24.

The movement assembly 18 is mounted for operation over pulleys 26 and 27, which are rotatably mounted on the lateral support member 24 by bearings such as bearing 28. The movement assembly 18 is primarily a dual cable-chain system mounted between the drums 72 and 73. Each half of the dual cable system employs two lengths of cable with a short length of flexible chain interposed therebetween. Accordingly, as may be best seen in FIGURES 3 and 4, the cable system portion which operates on the pulley 26 includes cables 70 and 70' with a flexible chain 74 connected therebetween. In like manner, the cable system portion which operates on the pulley 27 includes cables 71 and 71' with a flexible chain 75 connected therebetween.

Each half of the dual cable system extends from the front drum 72 over pulleys such as pulley 78 (see FIGURE 1). After traversing the pulleys 26 and 27, the cables of the dual cable system extend rearward and over pulleys on the hook 80 to the rear drum 73.

The constant tension of the front drum 72 is selected to be greater than the minimum tension but less than the maximum tension of the rear dual-tension drum 73. For example, the front drum 72 may exert a tension of 20 pounds while the rear drum 73 may be selectively operated at a minimum of 10 pounds or a maximum of 40 pounds.

During initial operations for grasping the target ring 14, the rear drum 73 is at its minimum tension and the front drum 72 maintains the cable system retracted thereto. However, a stop 29 is employed on the support 20 to cooperate with a crossbar 76 to limit the retraction of the cables. The crossbar 76 is connected between corresponding extremities of the flexible chains 74 and 75, and the opposite extremities of the chains 74 and 75 have the resilient hooks 30 and 31, respectively, mounted thereon. Accordingly, when the dual cable system is retracted to the stop 29 by the front drum 72, the resilient hooks 30 and 31 are retracted to a grasping position "W" within the guide-engaging assembly 16 (see FIGURES 3 and 4).

The purpose of utilizing a dual cable arrangement is to enable the system to grasp the target ring 14 and hold it in a preselected orientation with respect to the hook 80. Accordingly, the two resilient hooks 30 and 31 assure positive connection of the target ring 14 with the hook 80 by restraining the ring 14 from being drawn to one side or rotating. Additionally, the crossbar 76 and the flexible chains 74 and 75 maintain the hooks 30 and 31 in the desired orientation by restraining the rotational characteristics of the cables.

As clearly illustrated in FIGURES 3 and 4, when the aircraft 10 is maneuvered to grasp the target ring 14, the ring 14 is guided into a funnel-type convergent receptacle comprised of guide rods 32 and 33 and a sheet metal guide 40. The guide rods 32 and 33 form a movable "jaw" portion of the funnel and are fixedly connected to the rotatable shaft 25 for rotating in unison with each other and with the shaft 25 when the ring 14 is urged thereagainst.

The guide rods 32 and 33 employ ear portions such as ear portion 38 for fixed connection to the rotatable shaft 25. The ear portion 38 of the guide rod 32 is adapted to abut against a stop member 62, which is mounted on the sheet metal guide 40 by fasteners such as rivets. The purpose of the stop member 62 and its engagement with the ear portion 38 is to restrict the guide rods 32 and 33 from rotating to a closed position with respect to the sheet metal guide 40. That is, unless the stop member 62 is utilized, springs 34 and 35, which are connected between arms 32' and 33' of the guide rods 32 and 33, respectively, and opposite ends of a bar 36 extending transversely through the support member 20 will cause the guide rods 32 and 33 to rotate clockwise. The guide rods 32 and 33 are each keyed against a shoulder, such as shoulder 37, on the rotatable shaft 25 by fasteners, which threadably engage opposite extremities of the rotatable shaft 25.

The sheet metal guide 40 is substantially a metallic shoe having an essentially flat face portion 41 and spaced integral side portions 42 and 43 for providing rigidity to the flat surface portion 41. The flat surface portion 41 has two openings or slots 44 and 45 therein for allowing the resilient hooks 30 and 31 to be driven therethrough. Accordingly, the side portions 42 and 43 extend downward beyond the lower extremity of the front surface portion 41 and form support legs 46 and 47.

The support legs 46 and 47 are spaced from the pulleys 26 and 27 and their respective bearings, such as bearing 28, by respective spacers 50 and 51, which are mounted on the lateral support member 24. The lateral support member 24 employs external threads at each of the extremities thereof for engagement with fasteners 49 and 52, which urge the support legs 46 and 47, the spacers 50 and 51, and the pulleys 26 and 27 against shoulders, such as shoulder 48 of the lateral support member 24. The support legs 46 and 47, as integral portions of the side portions 42 and 43, also extend rearwardly and are fixedly mounted on the fastener 23. In this manner, the sheet metal guide 40 is prevented from rotating about the axis of the lateral support 24 and is fixedly held to the support 20.

When the target ring 14 is guided into the funnel formed between the guide 40 and the guide rods 32 and 33, it strikes a pawl 53. The pawl 53 is a pivotal member employed for selected contact with the load and is rotatably mounted on the transverse support member 24 between the T-shaped member 21 and the pulley 26. Of course, since the pawl 53 is required to rotate with respect to the inner race of the bearing 28, suitable means such as a washer 54 may be employed therebetween.

The pawl 53 includes a hook or projection 59 for connection to a spring 60, which is connected to a protrusion 61 on the front face portion 41 of the guide 40. Accordingly, the pawl or lever 53 is rotatably biased in a clockwise direction. The pawl 53 also includes a second projection 55, which operates a micro switch 56 that is mounted on the support member 20 by a bracket 57. The bracket 57 includes arms such as arm 58 for being mounted to the support 20 by the fastener 22. Of course, the bracket 57 also may be fixedly held in place by the fastener 23 as illustrated in FIGURE 3.

The pawl 53 is normally biased into engagement with the plunger on the micro switch 56 by the spring 60. In this manner, the switch 56 is normally held in an opened or off condition. However, when the target ring 14 is guided into the funnel between the guide rods 32 and 33 and the guide 40, the target ring 14 strikes the pawl 53 and rotates it in a counterclockwise direction against the force of the spring 60. This disengages the lever projection 55 from the plunger of the micro switch 56 and energizes the rear drum 73 to its maximum tension.

When the rear drum 73 exerts its maximum tension, it drives the cables of the dual cable system and causes the resilient hooks 30 and 31 to translate from position "W" and engage the target ring 14 as shown in phantom in position "X" (see FIGURE 3). Continued tension by the rear drum 73 causes the guide rods 32 and 33 to rotate in a counterclockwise direction as seen in phantom in position "Y," and the target ring 14 eventually slides off the guide rods 32 and 33 as shown in phantom in position "Z."

The cargo-carrying assembly 19, which is utilized to ultimately receive the target ring 14, may be best understood by reference to FIGURES 5 and 6. The hook 80 employs a main load-bearing member 96, which is connected to the structure of the aircraft 10. The hook 80 also includes two side plates 85 and 86, which are connected at the upper extremities to the main load-carrying member 96 by fasteners such as bolts 89 and 97. The lower extremities of the two side plates 85 and 86 are spaced apart by a rotatable hook member 81, which is rotatably engaged within and supported by the side plates 85 and 86. The hook member 81 includes a spike-hook portion 99 and a pair of pulleys 82 and 83 for engaging the cables 70 and 71 and for facilitating movement of these cables to and from the rear drum 73. The pulleys 82 and 83 employ suitable bearing members such as bearing 84 for enabling the pulleys to rotate with respect to the hook member 81. Additionally, it should be understood that the grooves of the pulleys 82 and 83 are widened and enlarged to insure reseating of the cables 70 and 71 if they exit therefrom during hovering and descent pickup operations.

The hook member 81 is either rotated to a closed position "L" or an open position "M" by a hydraulic cylinder 87 (see FIGURE 6). The hydraulic cylinder is mounted on the hook member 81 through a rigid link 98, which is pivotally connected to the hook member through a tongue-and-groove hinge by a pin 98'. A shaft 88, which is connected to a piston assembly (not shown) internally of the cylinder 87, mounts the cylinder on the bolt 89. That is, the bolt 89 traverses shaft 88 of the cylinder 87 and is rotatably mounted in the main support member 96 and the side plates 85 and 86.

Additionally, the shaft 88 has a bore extending along its longitudinal axis for porting hydraulic fluid to the cylinder 87 from a hydraulic input 95. Of course, the hydraulic fluid is ported around the bolt 89 which traverses the shaft 88. Accordingly, upon actuation of the hydraulic cylinder 87 by the application of hydraulic fluid through input 95, the body of the cylinder 87 translates toward the bolt 89 and the rotatable hook member 81 is rotated in a counterclockwise direction through the link 98. This drives the hook member 81 to the open hook position "M" (see FIGURE 6).

As shown in FIGURE 6, the hook member 81 has a flat upper surface 91, which contacts a micro switch 92 when the hook member 81 is rotated into a closed position. This micro switch 92 has a plunger 93 and is mounted to the side plate members 85 and 86 by a bracket 94. Of course, the hook 80 has the normal keeper arrangement 90 to allow entry of the ring 14 into the throat of the spike 99, but to restrict exit thereof.

As shown in FIGURES 5 to 8, the cable 70 traverses a guide ring 111, which is a portion of a cable-angle device or guidance system portion 100. The guide ring 111 includes a first arm 107 connected to a second arm 109 through a hinge 108. However, hinge action of the arm 109 with respect to the arm 107 is limited by clip 109', which is integral with the arm 109. The arms 107 and 109 also include apertures 118 and 119 through which the cable 70 passes to the drum 73. The cable 70 includes thereon a stop button 77, which has a diameter greater than the diameter of the aperture 119 of the arm 109. Accordingly, when the cable is retracted to the drum 73, the stop button 77 engages the arm 109 and rotates the arm 109 on the hinge 108 to depress a plunger 116 of a micro switch 115 mounted on the arm 107. Depression of the plunger 116 actuates the hydraulic system of the aircraft to port hydraulic fluid to the cylinder 87. Accordingly, the hook member 81 is rotated to position "L" and grasps the target ring 14, which is held by the resilient hooks 30 and 31 at position "N" (see FIGURE 6).

As the hydraulic cylinder 87 drives the hook member 81 in a clockwise direction, the flat surface 91 of the hook member 81 depresses the plunger 93 of the micro switch 92. This causes the rear drum to reassume its minimum tension and allows the forward drum 72 to retract the resilient hooks 30 and 31 to their initial position "W" (see FIGURE 3). Accordingly, it should be understood that the micro switches 56, 92, and 115 actually function as a part of the movement assembly.

As may be seen in FIGURES 6 to 8, the cable-angle device 100 is employed for indicating the angle of the cable with respect to attitude of the aircraft 10 relative to the horizon. That is, the cable-angle device 100 is traversed by the cable 70 as the cable extends toward the drum 73 during hovering and aircraft descent prior to grasping of the ring 14 by the hook 80. Of course, it should be understood that for proper operation of the cable-angle device 100, the hook 80 is mounted in a substantially motionless manner. That is, during hovering and descent, the hook 80 is restricted from motion with respect to the pitch and roll axis of the aircraft 10.

The cable-angle device 100 employs a pitch axis potentiometer 101 and a roll axis potentiometer 102. The potentiometer 101 is fixedly connected to the hook side plate 86 by a bracket 79.

A circular member 103 is rotatably connected to the bracket 79 by pins or shafts 104 and 104', which are integral with the circular member 103 (see FIGURES 7 and 8). The shaft 104 extends through the bracket 79 and into the potentiometer 101 to operate a wiper arm to vary the position on the resistance of the potentiometer of the wiper arm in accordance with rotation of the shaft. Accordingly, if the circular member 103 is rotated about the longitudinal axis of the shaft 104, the position of the wiper arm is varied. The circular member 103 employs an inner guide portion 110, which is mounted to the circular member 103 by radial supports 68 and 69. The inner guide 110 guides the cable 70 through the longitudinal axis of the circular member 103 as the cable traverses upward to the drum 73 from the guide ring 111.

Additionally, the circular member 103 is connected to the guide ring 111 by a pair of leg supports 105 and 106, which are rotatably mounted through bores 112 and 113 in the circular member 103. Accordingly, when the aircraft 10 executes a pitch maneuver, the leg supports 105 and 106 and guide ring 111 rotate about the longitudinal axis of the shafts 104 and 104'. This is caused by the transverse movement of the cable 70 against the apertures 118 and 119 while traversing the center of the inner guide 110. In this manner, the shaft 104 is rotated to vary the position of the wiper arm of the potentiometer 101 with respect to the resistance thereof.

Since the leg supports 105 and 106 are rotatably mounted in the bores 112 and 113 of the circular member 103, the leg supports 105 and 106 and guide ring 111 are rotatable about the longitudinal axes of leg support portions 128 and 129. Of course, the longitudinal axes of leg support portions 128 and 129 extend in a direction perpendicular to the longitudinal axis of the shaft 104. Accoringly, when the aircraft 10 executes a rolling maneuver, the leg supports 105 and 106 and the guide ring 111 rotate about the longitudinal axes of the leg support portions 128 and 129. The leg support portion 128 extends through the circular member 103 and into the potentiometer 102 to operate a wiper arm to vary the position of the wiper arm on the resistance of the potentimeter 102 in accordance with rotation of the leg support portion 128 about the roll axis.

From the foregoing it may be readily understood that roll maneuvers of the aircraft 10 will be sensed by the potentiometer 102 in accordance with a change in wiper arm position by the leg support portion 128. In like manner, pitch maneuvers of the aircraft 10 will be sensed by the potentiometer 101 in accordance with a change in wiper arm position by the shaft 104. Of course, maneuvers of the aircraft 10 that include both a pitch and a roll change will cause the pitch potentiometer 101 to sense the pitch component and the roll potentiometer 102 to sense the roll component.

As shown in FIGURE 8, the potentiometers 101 and 102 include suitable electrical leads for connection into the remainder of the wire guidance system of the invention. That is, potentiometer 101 includes electrical leads 131 and 131' to opposite extremities of the potentiometer resistance and a wiper arm 132. In like manner, the potentiometer 102 includes electrical leads 135 and 135' to opposite extremities of the potentiometer resistance and a wiper arm 137.

It should be understood that the outputs of potentiometers 102 and 103 are connected to a display or indicator 116 (see FIGURES 1 and 9). The display 116 employs two galvanometer windings 126 and 127 for driving indicating needles 117 and 120. When the angle of cable 70 is varied, a potential difference occurs across each of the galvanometer windings 26 and 27 thereby causing the hairs 117 and 120 to move. The intersection of the needles 117 and 120 tends to indicate the position of the cable 70 with regard to aircraft position 121. For example, as shown in FIGURE 9 the needles 117 and 120 indicate that the aircraft is to the right and forward of the desired position with respect to the load cargo 15 and the cable is, therefore, extending downward to the left and to the rear of the aircraft. The position 121 of the aircraft 10 is indicated on the display 116 by the intersection of two permanently inscribed lines 124 and 125.

However, the cable-angle device 100 is not, in itself, satisfactory to operate the display 116 so as to accurately indicate the information needed with respect to desired positional relationship of the aircraft to cargo 15. That is, when, as in FIGURE 9, the aircraft 10 is to the right of the desired position, a rolling movement must be imparted to the aircraft in order to cause it to move in that direction. Accordingly, this rolling movement initially aggravates the indicated cable-angle error, which is sensed by the cable-angle device 100. The same is true about the pitch axis. That is, in order to move rearward toward the desired position, the pilot of the aircraft 10 must induce a pitching movement. In doing this, the cable-angle device 100 senses an increased cable-angle error about the pitch axis. Of course, if the cable-angle device 100 were utilized alone, the pilot of the aircraft 10 would be misled by the display 116.

Additionally, the cable-angle device 100 has no sensitivity adjustment with respect to the height of the aircraft from the cargo 15. That is, if the aircraft is 20 feet above the load, a deviation of 2 feet would appear as a minimal amount on the display 116. However, if the aircraft is 2 feet above and from engagement with the target ring 14, a sudden gust of wind may cause a 2-foot shift of the aircraft 10, and the display 116 will indicate an enormous cable-angle error.

From the foregoing it can be readily understood that it is desirable to eliminate or "wash out" the cable-angle measurement resulting from pitch or roll movements of the aircraft 10 that are induced to correct the position of the aircraft 10 with respect to the cargo 15. Additionally, it is desirable to adjust the sensitivity of the display system so that it is more sensitive when the aircraft 10 is, for example, 20 feet above the cargo load 15 and to significantly decrease the sensitivity as the aircraft 10 lowers in hover toward the cargo load 15.

Figure 10:
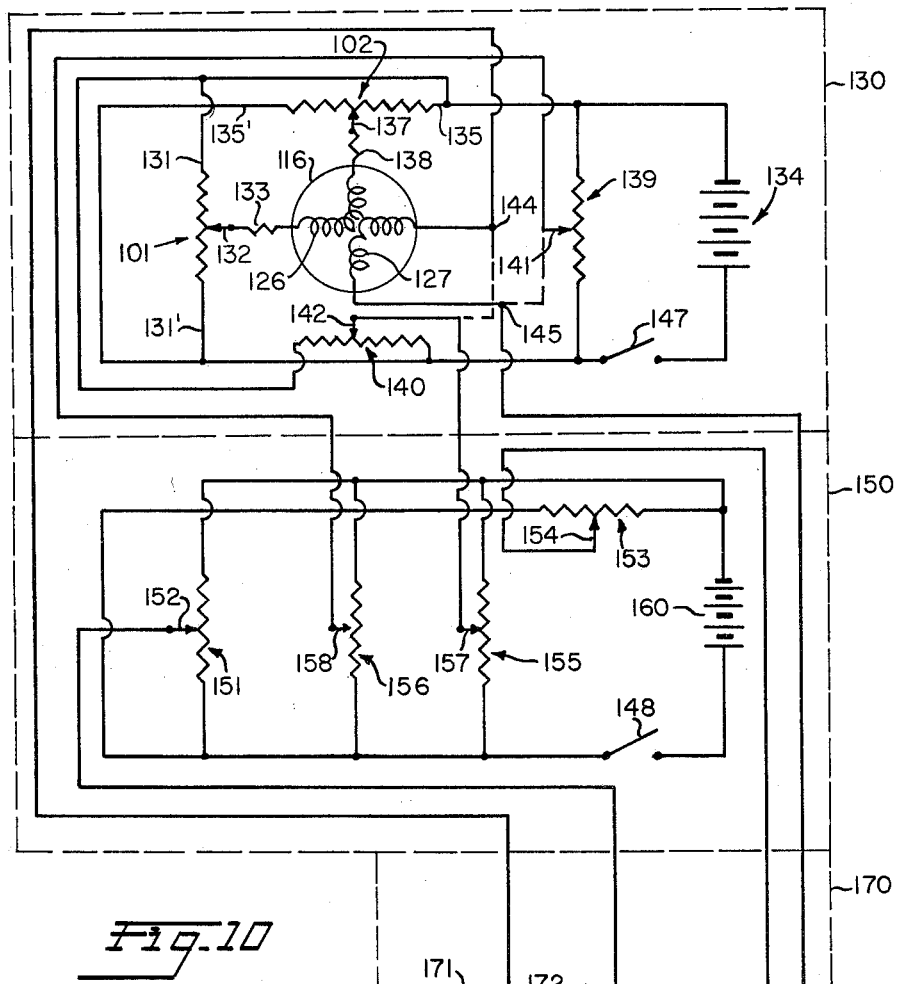
FIGURE 10 is a wiring diagram of the circuitry involved in the guidance system of the invention for providing the pilot with information concerning the relative position of the aircraft with respect to a ground load.

FIGURE 10 illustrates a guidance system by which the display 116 accurately indicates the desired positional relationship of the aircraft with respect to the cargo 15. That is, the system of FIGURE 10 includes the potentiometers 101 and 102 for measuring variations of the cable angle about the pitch and roll axis of the aircraft, compensates for the pitch and roll movements of the aircraft that occur in adjusting the position of the aircraft relative to the cargo 15, and adjusts the sensitivity of the system so it is less sensitive at decreasing altitudes.

The guidance system of FIGURE 10 comprises three basic component parts. That is, the display system has the cable-angle circuit or sensing means 130, a pitch-roll compensation circuit 150, and a distance sensitivity control 170. The leads 131 and 131' of potentiometer 101 are connected to a source of potential 134. The leads 135 and 135' of potentiometer 102 also are connected to the source of potential 134 and in such a manner as to place the potentiometer 102 in parallel with the potentiometer 101. The wiper arms 132 and 137 of potentiometers 101 and 102 are connected to the display indicator 116 and the windings 126 and 127 thereof. The wiper arms 132 and 137 are connected to the windings 126 and 127, respectively, through resistances 133 and 138, which are current-limiting resistors utilized for the protection of the display instrument 116.

Potentiometers 139 and 140 are connected in parallel with respect to each other and with respect to potentiometers 101 and 102. The potentiometers 139 and 140 are included for providing zero adjustment of pitch and roll errors for the potentiometers 101 and 102 of the cable-angle device 100. That is, when it is desired that potentiometers 139 and 140 be utilized to adjust the potentiometers 101 and 102 with respect to the display instrument 116 for indicating zero cable-angle error, wiper arms 141 and 142 of the potentiometers 139 and 140, respectively, are placed in series with wiper arms 132 and 137. For example, the wiper arm 142 is placed in series with the wiper arm 132 by opening the remainder of the circuit and by placing an electrical lead between the wiper arm 142 and point 144 as shown in phantom. Then to adjust the pitch potentiometer 101 to zero adjustment, the wiper arms 132 and 142 are positioned centrally of the resistors of potentiometers 101 and 140, respectively, and thereafter adjusted slightly to indicate zero potential across the display 116 and through the coil 126. Potentiometer 102 is adjusted in like manner by opening the remainder of the circuit and placing an electrical lead between the wiper arm 141 and point 145 as shown in phantom.

The terminal of the winding 126, which is opposite to the terminal of the winding that is connected to the resistor 133, is connected through a wiper arm 172 to a potentiometer 171. The potentiometer 171 comprises one of the two potentiometers employed in the distance sensitivity control 170. The terminal of the winding 127, which is opposite to the terminal of the winding 127 that is connected to the resistor 138, is connected through a wiper 174 to a potentiometer 173, which is the second potentiometer of the distance sensitivity control 170.

Figure 11:
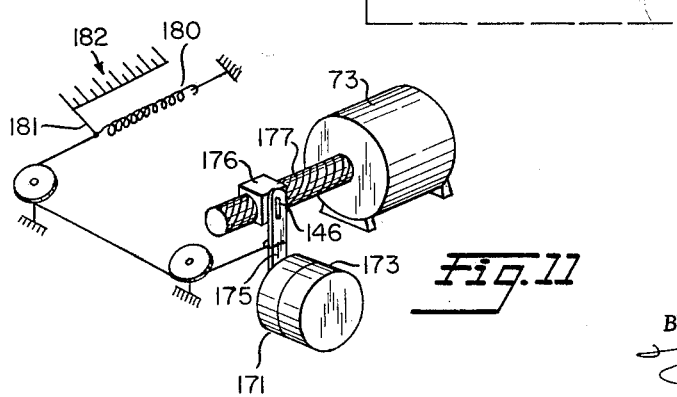
FIGURE 11 is a perspective schematic of the means for indicating the distance relationship between the resilient hook means and the cargo-carrying hook.

As may be seen by reference to FIGURE 11, the potentiometers 171 and 173 have their respective wipers 172 and 174 connected to a rotatable shaft (not shown), which is fixedly connected to a link 175. The link 175 is slidably engaged through a slot 146 to a nut-like member 176, which is threadably secured to a shaft 177 of the motor-driven dual tension drum 73. Accordingly, the shaft 177 rotates as the drum 73 operates to retract the cables 70 and 71 thereto during aircraft descent in hover for grasping the cargo 15. However, the link 175 holds the nut-like member 176 from rotating with the shaft 177; this causes the nut-like member 176 to translate along the longitudinal axis of the shaft 177. As the nut member 176 moves along the shaft 177, the link 175 pivots about the longitudinal axis of the shaft (not shown) which is connected to the wiper arms 172 and 174 of the potentiometers 171 and 173 for varying the positions of the wiper arms.

Accordingly, as the aircraft lowers toward the cargo 15 and as the drum 73 reels in the cables 70 and 71, the wipers 172 and 174 are adjusted on the resistances of the potentiometers 171 and 173. In this manner, voltage drop across the potentiometers 171 and 173 is varied as is the potential of the terminals 178 and 179, respectively.

If the terminals 178 and 179 were directly connected to the wiper arms 142 and 141, respectively, of the cable-angle circuit 130, the guidance system would indicate, on the display 116, the cable-angle error about the pitch and roll axis, and the sensitivity of the guidance system would be adjusted in accordance with the altitude of the aircraft by the distance sensitivity control 170. However, position of the cable, as indicated on the display 116, includes angle errors induced by aircraft maneuvers. Accordingly, the terminals 173 and 179 are connected through wiper arms 152 and 154 to potentiometers 151 and 153, respectively. The potentiometers 151 and 153 comprise two of four potentiometers employed in the pitch-roll compensation circuit 150.

The potentiometers 151 and 153 comprise a portion of a displacement gyroscope, which has the gimbals thereof attached to shafts for driving the wipers 152 and 154 about the pitch and roll axis, respectively. The pitch-roll compensation circuit 150 utilizes the pitch gyro potentiometer 151, the roll gyro potentiometer 153, and potentiometers 155 and 156 in parallel with respect to each other and placed across a source of potential 160.

The potentiometers 155 and 156 are included for the purpose of providing zero adjustment for the gyroscope pitch and roll positions, respectively. That is, zero pitch adjustment may be accomplished in a manner similar to that set forth above with respect to the cable-angle circuit 130. In this manner, the wiper arm 152 and wiper arm 157 of the potentiometer 155 may be centered on the resistances of their potentiometers 151 and 155, respectively. Thereafter, the wiper arms are slightly adjusted until zero potential is recorded between the two wiper arms. Of course, wiper arm 158 of the potentiometer 156 and the wiper arm 154 of the potentiometer 153 may be adjusted in like manner to accomplish zero adjustment of the displacement gyro about the roll axis.

From the foregoing it can be understood that, if the aircraft must adjust its position to achieve a desirable position with respect to the cargo 15, there will be an increased pitch angle cable error from the potentiometer 101 due to maneuvering of the aircraft. However, while the gyroscope does not sense the change in the cable angle because of the maneuvering of the aircraft, the gyroscope does sense the change of the aircraft 10 about its pitch or roll axis. Thus, for example, if the aircraft is maneuvered to move forward and thereby causes a variation in pitch, the displacement gyro modifies the position of the wiper 152 on the pitch gyro potentiometer 151 thereby changing the electrical conditions of the potentiometers 153, 155, and 156 and the zero potential relationship between the potentiometers 151 and 155. However, since the change on potentiometers 153, 155, and 156 is equal, the zero potential between the roll gyro potentiometer 153 and the potentiometer 156 will not be affected. That is, regardless of the potential change across the potentiometers 153 and 156, there will be no effect on the roll portion of the circuitry if this change equally affects both the potentiometer 153 and the potentiometer 156.

However, the changed electrical conditions do affect the potentiometer 155 since its zero relationship with respect to the potentiometer 151, which is an associated potentiometer in the pitch circuit, is changed. This causes a change in potential on the wiper arm 142 of the potentiometer 140. Since wiper arms 132 and 142 are effectively connected through the circuits to opposite terminals of the winding 126, there will be no indication of pitch change on the indicator 116 if the voltages on the wiper arms 132 and 142 are the same. However, if the voltages thereon are different, the algebraic sum thereof will be applied across the indicator 116 and a visual indication will result thereon. Changes in potential applied to the wiper arm 142 will be equal but opposite to that part of the potential derived from the potentiometer 101 that resulted from an increased cable-angle change about the pitch axis when the aircraft increased its pitch-angle error due to corrective maneuvering. Of course, the relationship of potentiometers 153 and 156 with respect to the roll axis of the aircraft is identical to the relationship of the potentiometers 151 and 155 with respect to the pitch axis of the aircraft.

Accordingly, it can be clearly understood that any cable-angle error sensed by the cable-angle circuit 130, as a result of corrective maneuvering of the aircraft, is cancelled by an equal but opposite potential derived from the displacement gyro and through the pitch-roll compensation circuit 150. In this manner, the pitch-roll compensation circuit 150 is either additive or subtractive from the potential derived by the cable-angle circuit 130.

It should be understood that if there are no corrective aircraft maneuvers, the changes in potential due to, for example, aircraft drifting and a resultant cable-angle error will operate through the system in the same manner as hereinabove set forth. That is, if the aircraft drifts forward from the desired position 121, movement of the wiper arm 132 of the potentiometer 101 will apply a change in potential to the wiper arm 152 of the potentiometer 151 through the winding 126 and through the potentiometer 171. In this manner, the relative change in potential of the wiper arm 152 with respect to the wiper arm 157 will be applied to the wiper arm 142 and will exist across the winding 126 to cause an error indication to the be shown on the display 116. However, corrective maneuvers to correct for the drift will not, in themselves, result in a voltage differential across the winding 126. Additionally, it should be understood that switches such as switches 147 and 148 may be utilized to energize and de-energize the guidance system as desired. Of course, the switches 147 and 148 may be ganged for simultaneous operation.

It is also desirable to indicate, for the knowledge of the pilot, the distance of the aircraft 10 above the cargo 15. As seen in FIGURE 11, this is accomplished by attaching a spring 180 between aircraft structure and the link 175. Accordingly, as the link 175 is pivoted by the nut member 176, the spring 180 will extend or retract. A pointer 181 is placed between the spring 180 and the link 175 to indicate on a scale 182 the distance between the aircraft 10 and the target ring 14 and the amount the aircraft must descend to grasp the target ring 14. Additionally, suitable pulley arrangements such as illustrated in FIGURE 11 may be employed if desired to effect the distance indicator function required.

The operation of the cargo pickup system of this invention may be best understood by reference to FIGURES 12 through 14. As seen in FIGURE 12, the aircraft 10 is operated so as to hover close to and in line with the target adapter ring 14. Subsequently, the aircraft 10 is flown slowly forward in such a manner that the target adapter ring 14 is guided into engagement with the guide-engaging assembly 16. That is, as the aircraft 10 is flown forward, the target adapter ring 14 is guided into the throat of the funnel formed by the sheet metal guide member 40 and the guide rods 32 and 33. As the target adapter ring 14 slides down the flat front surface 41 of the guide member 40 or up the guide rods 32 and 33, it strikes the pawl 53. As the target ring 14 strikes the pawl 53, the pawl is caused to rotate in a counterclockwise direction against the force of the spring 60, and as the pawl 53 rotates it releases the plunger of the micro switch 56 from its normally open or off position.

The release of the plunger causes the rear motor-driven tension drum 73 to increase its tension on the cables 70 and 71 to an amount greater than the tension provided by the constant-tention drum 72. Since the tension provided by the rear drum 73 is now greater than the forward drum 72, the cable assemblies are driven so as to cause the cables 70 and 71 to be urged in a manner for winding on the motor-driven drum 73. Accordingly, the resilient hooks 30 and 31 are driven from their normally retracted position "W" (see FIGURE 3) to position "X" so as to pass through and grasp the target ring 14 (see FIGURE 3).

The tension from the rear drum 72 then continues to urge the resilient hooks 30 and 31 through the throat of the funnel between the guide member 40 and the guide rods 32 and 33 and rearward of the aircraft. Accordingly, as the target ring is moved rearwardly through positions "Y" and "Z," the guide rods 32 and 33 are rotated in a counterclockwise direction against the force of the springs 34 and 35. Position "Z" illustrates the target ring 14 about to be drawn past the tips of the guide rods (see FIGURE 3). After the target ring 14 is drawn past the guide rods, the guide rods rotate in a clockwise direction in response to the springs 34 and 35 and return to their initial position as determined by the stop 62.

Once the aircraft has snagged the target ring 14 with the resilient hooks 30 and 31, its altitude is increased to approximately 20 or 30 feet for hovering almost directly over the cargo 15 or, preferably, at a slight angle as shown in FIGURE 13. While at hover approximately 20 or 30 feet above the cargo 15, the aircraft 10 has its dual-tension drum 73 providing a tension greater than the tension provided by the forward constant tension drum 72.

Also, when the altitude of the aircraft has been raised to a position 20 or 30 feet above the cargo 15, the guidance system illustrated in FIGURES 5 to 10 is manually turned on by the pilot. Of course, when the guidance system is turned on, the display 116 illustrates the cable angle sensed by the cable-angle device 100, which is corrected by the pitch-roll compensation circuit 150 and adjusted in sensitivity by the distance sensitivity control 170. Additionally, the distance of the aircraft from the cargo is measured by the scale 182, which is operated by the shaft 177 of the rear drum 73.

It should be understood that, when the aircraft is hovering above the cargo 15 and when the pilot turns on the guidance system, the aircraft hydraulic system drives the hydraulic cylinder 87 to rotate the hook member 81 to position "M," which is its open position (see FIGURE 6). Accordingly, micro switches 92 and 115 are not yet actuated. Additionally, it should be understood that as the aircraft is allowed to descend the drum 73, the resilient hooks 30 and 31, and the cables being employed as connecting means therebetween function as a part of the guidance system.

As shown in FIGURE 14, the final grasping operation is accomplished by lowering the aircraft 10 over the load 12. During this operation the guidance system is utilized to control the aircraft in a proper descent path until the adapter ring 14 is drawn to position "N" by the resilient hooks 30 and 31 (see FIGURES 6 and 14). At this point the resilient hook 30 is positioned at position "N" (see FIGURE 6) and the stop button or bead 77 on the cable 70 is depressing the plunger 116 of the micro switch 115 by driving the arm 109 about the hinge 108. As the stop button 77 depresses the plunger 116, the hydraulic system within the aircraft 10 operates to actuate the hydraulic cylinder 87 to extend the link 98 and drive the rotatable hook member and its integral spike hook 99 to the closed position "L" (see FIGURE 6).

As the hook member 81 rotates and closes, it captivates the adapter ring 14 and also energizes the micro switch 92 by depressing the plunger 93 with the flat surface 91. Energization of the micro switch 92 returns the rear dual-tension drum 73 to a tension less than the tension of the forward tension drum 72. This causes the cable assemblies to be retracted toward the front tension drum 72 until the resilient hooks 30 and 31 are in their initial position "W" as illustrated in FIGURES 3 and 4.

It should be understood that the bead 77 is placed on the cable 70 at a distance from the resilient hooks 30 and 31 so that as the rotatable hook member 81 drives the hook spike 99 clockwise the resilient hooks have properly placed the target ring for grasping by the hook spike 99. Additionally, the crossbar 36 is positioned at a sufficient distance from the bead 77 so that it is not captivated by the hook 80.

After the target ring 14 is grasped by the spike hook 99, the wire guidance system may be manually turned off by the pilot, and the pilot may lift the cargo 15 and deliver it to its destination. It should be understood that the cargo 12 may be jettisoned by a release feature which is built into the hook 80 and is not a part of this invention. However, during the procedure of placing the target ring 14 into the hook 80 and while the resilient hooks 30 and 31 grasp the target ring 14, the pickup of the load 15 also may be aborted. Such an abort is accomplished by increasing the altitude of the aircraft so as to drive the tension drum 73 in a direction opposite to its intended direction. In this manner, the cables 70 and 71 are unwound from the cable drum 73. When the cables 70 and 71 are unwound to their extremities, which are connected to the drum 73, the resilient hooks 30 and 31, which may be constructed of spring steel, flex to release the target adapter ring 14.

It should be understood that the support 20 may be constructed to be telescopic, springloaded, retractable, or hinged or any combination thereof for obtaining the flexibility desired in the support 20. Additionally, as shown in FIGURE 2, two stabilizing and antifouling cables 66 and 67 may be provided to insure that the ring 14 does not foul the guide 40.

As can be clearly understood from the foregoing, the pickup system of this invention incorporates numerous advantages and heretofore unavailable features. Among other advantages this invention provides for the engagement of a transitory engaging device with a ground load in clear view and under full control of a pilot of an airborne aircraft. Additionally, after the transitory engaging device grasps the ground load, the load is transferred therefrom in an accurate, efficient, and positive manner to the aircraft's cargo-carrying member, which is not normally visible to the pilot. This accurate, efficient, and positive transfer is accomplished by the guidance system of the invention by which the pilot is provided with complete and accurate information concerning the position of the aircraft with respect to the ground load. An important safety feature of this invention is that means are provided for aborting a pickup operation at all times during the operation.

For purposes of exemplification, a particular embodiment of the invention has been shown and described according to the present understanding thereof. However, it will be apparent that changes and modifications in the arrangement and construction of the parts may be resorted to without departing from the spirit and scope of the invention.

We claim:

1. A pickup system comprising a movable platform, contact means mounted on said platform for contacting a load, load engagement means on said movable platform in spaced relation to said contact means, and movement means mounted on said movable platform and having transistory means mounted thereon, said movement means being responsive to selected contact of the load by said contact means for moving said transistory means into engagement with the load and for moving said transistory means with respect to said movable platform between a first position adjacent said contact means and a second position adjacent said engagement means, said engagement means being responsive to movement of the transistory means to the second position for engaging the load.

2. In combination with an aircraft, a pickup system comprising contact means mounted on said aircraft for contacting a load, engagement means mounted on said aircraft in spaced relation to said contact means, and movement means mounted on said aircraft having transitory means mounted thereon, said movement means being responsive to selected contact of said contact means with the load to move said transistory means into engagement with the load and for movement of said transitory means with respect to said aircraft between a first position adjacent said contact means and a second position adjacent said engagement means, said engagement means being responsive to movement of said transitory means to the second position for engaging the load.

3. In combination with an aircraft, a pickup system as claimed in claim 2 wherein said movement means comprises said transitory means, first tension means mounted on said aircraft and connected to a first extremity of said transitory means for applying a first tension thereto, and second tension means mounted on said aircraft and connected to a second extremity of said transitory means, said second tension means being responsive to the selected contact of the load by said contact means to apply a second tension greater than the first tension applied to said transitory means by said first tension means.

4. In combination with an aircraft, a pickup system as claimed in claim 3 wherein said movement means further comprises first switch means mounted on said contact means to sense selected contact of a load by said contact means, said first switch means being connected to said second tension means for conditioning said second tension means to exert the second tension, and second switch means mounted on said engagement means to sense movement of said engagement means into load-engaging position, said second switch means being connected to said second tension means for conditioning said second tension means to exert a third tension less than the first tension applied to said transitory means by said first tension means.

5. In combination with an aircraft, a pickup system as claimed in claim 4 wherein said transitory means extends from said first tension means through the first position adjacent said contact means and through the second position adjacent said engagement means to said second tension means for moving toward said first tension means when said second tension means exerts the third tension and toward said second tension means when said second tension means exerts the second tension.

6. In combination with an aircraft, a pickup system as claimed in claim 5 wherein said transitory means comprises a pair of flexible elongated means in parallel with respect to each other, each of said flexible elongated means including a first cable portion connected to said first tension means, a second cable portion connected to said second tension means, a chain portion interconnecting the free ends of said first and second cable portions, and a resilient grasping means mounted on said chain portion.

7. In combination with an aircraft, a pickup system as claimed in claim 4 wherein said contact means comprises support means mounted on said aircraft, pivotal means mounted on said supported means for pivoting in response to contact with a load, and guide means mounted on said support means for guiding the load into contact with said pivotal means, said pivotal means being in juxtaposed relationship to said first switch means for operating said first switch means whereby said second tension means responds to a changed condition of said first switch means to apply the second tension to said transitory means and move said transitory means into grasping relationship with respect to the load.

8. In combination with an aircraft, a pickup system as claimed in claim 7 wherein said guide means comprises first projecting means pivotally mounted on said support means, and second projecting means fixedly mounted on said support means, said first and said second projecting means divergently extending from said support means for forming a convergent receptacle, said pivotal means being mounted at the throat of said convergent receptacle formed by said throat and said projecting means whereby a load is guided into the throat of the convergent receptacle for contact with said pivotal means.

9. In combination with an aircraft, a pickup system as claimed in claim 8 wherein said contact means further comprises pulley means rotatably mounted on said support means for facilitating passage of said transistory means through the first position adjacent said contact means.

10. In combination with an aircraft, a pickup system as claimed in claim 6 wherein said contact means comprises support means mounted on said aircraft; guide means including first projecting means pivotally mounted on said support means, and second projecting means mounted on said support means; said first and said second projecting means divergently extending from said support means for forming a convergent receptacle; pivotal means mounted on said support means at the throat of said convergent receptacle for pivoting in response to contact with the load; said pivotal means being in juxtaposed relationship to said first switch means for operating said first switch means; and pulley means rotatably mounted on said support means for facilitating passage of said transistory means through the first position adjacent said contact means whereby said guide means guide the load into contact with said pivotal means and second tension means responds to said contact of said pivotal means and the load to apply the second tension for moving the transitory means into grasping relationship with respect to the load.

11. In combination with an aircraft, a pickup system as claimed in claim 10 wherein said engagement means comprises a load-carrying cargo hook mounted on said aircraft and having second pulley means for facilitating passage of said transistory means through the second position adjacent said engagement means.

12. In combination with an aircraft, a pickup system comprising contact means mounted on said aircraft for contacting a load, engagement means mounted on said aircraft in spaced relationship to said contact means, movement means mounted on said aircraft and having transitory means including load-grasping means mounted thereon, said movement means being responsive to selected contact of said contact means with the load to move the transitory means and said load-grasping means thereon into engagement with the load and for movement of said transitory means with respect to said aircraft between a first position adjacent said contact means and a second position adjacent said engagement means, said engagement means being responsive to movement of said transitory means to the second position for engaging said load, and control means mounted on said aircraft and having a first control portion mounted in juxtaposed relationship to at least a portion of said movement means and being responsive to movements thereof for controlling movements of said aircraft with respect to the load and to position said aircraft for engagement of the load by said engagement means.

13. In combination with an aircraft, a pickup system as claimed in claim 12 wherein said movement means comprise said transistory means, first tension means mounted on said aircraft and connected to a first extremity of said transitory means for applying a first tension thereto, and second tension means mounted on said aircraft and connected to a second extremity of said transitory means, said second tension means being responsive to the selected contact of the load by said contact means to apply a second tension greater than the first tension to said transitory means.

14. In combination with an aircraft, a pickup system as claimed in claim 13 wherein said movement means further comprises first switch means mounted on said contact means to sense selected contact of a load by said contact means, said first switch means being connected to said second tension means for conditioning said second tension means to exert the second tension, second switch means mounted on at least a portion of said control means for sensing movement of said transitory means from the first position adjacent said contact means to the second position adjacent said engagement means for energizing said engagement means for movement into the load-engaging position thereof, and third switch means mounted on said engagement means to sense movement of said engagement means into load-engaging position, said third switch means being connected to said second tension means for conditioning said second tension means to exert a third tension less than said first tension, said transitory means extending from said first tension means through the first position adjacent said contact means and through the second position adjacent said engagement means to said second tension means for moving toward said first tension means when said second tension means exerts the third tension and toward said second tension means when said second tension means exerts the second tension.

15. In combination with an aircraft, a pickup system as claimed in claim 14 wherein said control means comprises sensing means for sensing the angular relationship of said aircraft with respect to said transitory means connected between said second tension means and said load-grasping means, and indicating means responsive to said sensing means for visually indicating the angular relationship.

16. In combination with an aircraft, a pickup system as claimed in claim 15 wherein said sensing means comprises first voltage variation means for sensing variations in the angular relationship of said aircraft with respect to said transitory means connected between said second tension means and said load-grasping means about a first axis of said aircraft and for applying to said indicator a voltage representing the variation in the angular relationship about said first axis, and a second voltage variation means for sensing variations in the angular relationship of said aircraft with respect to said transitory means about a second axis of said aircraft and for applying to said indicator a voltage representing the variation in the angular relationship about said second axis.

17. In combination with an aircraft, a pickup system as claimed in claim 16 wherein said control means includes compensating means for compensating for variations in the angular relationship of said transitory means with respect to said aircraft about said first and said second axes that occur as a result of maneuvers of said aircraft.

18. In combination with an aircraft, a pickup system as claimed in claim 17 wherein said compensating means comprises gyro means including third voltage variation means for sensing movements of said aircraft about said first axis thereof for applying to said indicator a compensating voltage representing movements of said aircraft about said first axis to compensate for the voltage applied to said indicator by said first voltage variation means of said sensing means as a result of the movements of said aircraft about said first axis thereof, and fourth voltage variation means for sensing movements of said aircraft about said second axis thereof and for applying to said indicator a compensating voltage representing movements of said aircraft about said second axis to compensate for the voltage applied to said indicator by said second voltage variation means of said sensing means as a result of the movements of said aircraft about said second axis thereof.

19. In combination with an aircraft, a pickup system as claimed in claim 16 wherein said control means comprises distance sensitivity control means for reducing the sensitivity of said indicator to variations in the angular relationship of said aircraft with respect to said transitory means connected between said second tension means and said load-grasping means as the length of said transitory means between second tension means and said load-grasping means decreases.

20. In combination with an aircraft, a pickup system as claimed in claim 19 wherein said distance sensitivity control means comprises third voltage variation means for reducing the sensitivity of said indicator to variations in the angular relationship of said aircraft about said first axis with respect to said transitory means connected between said second tension means and said load-grasping means as the distance between said engagement means and said load-grasping means decreases, and fourth voltage variation means for reducing the sensitivity of said indicator to variations in the angular relationship of said aircraft about said second axis with respect to said transitory means connected between said second tension means and said load-grasping means as the distance between said engagement means and said load-grasping means decreases.

21. A guidance system mounted on an aircraft for guiding an aircraft into juxtaposed relationship with a ground load comprising connecting means connecting said aircraft to the load, tension means mounted on said aircraft for receiving said connecting means as said aircraft approaches the ground load, control means including sensing means for sensing angular relationship of said aircraft with respect to said connecting means connected between said tension means and the ground load, and indicating means responsive to said sensing means for indicating the angular relationship of said aircraft with respect to said connecting means.

22. A guidance system as claimed in claim 21 wherein said sensing means comprise first voltage variation means for sensing variations in the angular relationship of said aircraft with respect to said connecting means about a first axis of said aircraft and for applying to said indicator a voltage representing the variation in the angular relationship about said first axis, and a second voltage variation means for sensing variations in said angular relationship of said aircraft with respect to said connecting means about a second axis of said aircraft and for applying to said indicator a voltage representing the variation in the angular relationship about said second axis.

23. A guidance system as claimed in claim 22 wherein said control means includes compensating means for compensating for variations in angular relationship of said connecting means with respect to said aircraft about said first and said second axes that occur as a result of maneuvers of said aircraft.

24. A guidance system as claimed in claim 23 wherein said compensating means comprises gyro means including third voltage variation means for sensing movements of said aircraft about said first axis thereof and for applying to said indicator a compensating voltage representing movements of said aircraft about said first axis to compensate for the voltage applied to said indicator by said first voltage variation means of said sensing means as a result of the movements of said aircraft about said first axis thereof, and fourth voltage variation means for sensing movements of said aircraft about said second axis thereof and for applying to said indicator a compensating voltage representing movements of said aircraft about said first axis to compensate for the voltage applied to said indicator by said second voltage variation means of said sensing means as a result of movements of said aircraft about said second axis thereof.

25. A guidance system as claimed in claim 22 wherein said control means comprises distance sensitivity control means for reducing the sensitivity of said indicator to variations in the angular relationship of said aircraft with respect to said connecting means as the length of said connecting means between said tension means and the load decreases.

26. A guidance system as claimed in claim 25 wherein said distance sensitivity control means comprises third voltage variation means for reducing the sensitivity of said indicator to variations in the angular relationship of said aircraft about said first axis with respect to said connecting means as the distance between said tension means and the load decreases, and fourth voltage variation means for reducing the sensitivity of said indicator to variations in angular relationship of said aircraft about said second axis with respect to said connecting means as the distance between said tension means and the load decreases.

27. The method of grasping a ground load with a flying vehicle comprising the steps of flying said vehicle into contact with the ground load, grasping the ground load by flexible and extensible means mounted on said vehicle, gaining altitude to a position of predetermined relationship of said vehicle to the ground load, reapproaching the ground load with said vehicle along the length of said flexible and extensible means when said flexible and extensible means are maintained substantially taut between said vehicle and the ground load, and contacting and grasping the ground load with cargo-engagement means mounted on said vehicle for relocation of the ground load.

28. The method of grasping a ground load with a hovering-type vehicle comprising the steps of contacting the ground load with said hovering vehicle, grasping the ground load with flexible and extensible means mounted on said hovering vehicle, gaining altitude to a position of predetermined relationship of said hovering vehicle with respect to the ground load therebelow, lowering said hovering vehicle toward the ground load, guiding the descent of said hovering vehicle to maintain substantially constant the angular relationship of said hovering vehicle and said flexible and extensible means when said flexible and extensible means are maintained substantially taut between the ground load and said hovering vehicle, and contacting and grasping the ground load with cargo-engagement means mounted on said hovering vehicle for relocation of the ground load.

29. The method of grasping a ground load with a hovering-type vehicle as claimed in claim 28 wherein the step of guiding the descent of said hovering vehicle to maintain substantially constant the angular relationship of said hovering vehicle and said flexible and extensible means when said flexible and extensible means are maintained substantially taut between the ground load and said hovering vehicle includes the steps of electrically sensing the angular relationship of said vehicle with respect to said flexible and extensible means about a first axis of said vehicle and electrically applying to a visual indicator a voltage representing the angular relationship about said first axis, and electrically sensing the angular relationship of said vehicle with respect to said flexible and extensible means about a second axis of said vehicle and electrically applying to said visual indicator a voltage representing the angular relationship about said second axis.

30. The method of grasping a ground load with a hovering-type vehicle as claimed in claim 28 wherein the step of guiding the descent of said hovering vehicle to maintain substantially constant the angular relationship of said hovering vehicle and said flexible and extensible means when said flexible and extensible means are maintained substantially taut between the ground load and said hovering vehicle further includes the steps of electrically sensing movements of said vehicle about said first axis, electrically applying to said indicator a compensating voltage representing movements of said vehicle about said first axis to compensate for voltage applied to said indicator as a result of the step of electrically applying to said indicator a voltage representing the angular relationship of said vehicle with respect to said flexible and extensible means about said first axis of said vehicle, sensing movements of said vehicle about said second axis, and electrically applying to said indicator a compensating voltage representing movements of said vehicle about said second axis to compensate for voltage applied to said indicator as a result of the step of electrically applying to said indicator a voltage representing the angular relationship of said vehicle with respect to said flexible and extensible means about said second axis of said vehicle.

31. The method of grasping a ground load with a hovering-type vehicle as claimed in claim 29 wherein the step of guiding the descent of said hovering vehicle to maintain substantially constant the angular relationship of said hovering vehicle and said flexible and extensible means when said flexible and extensible means are maintained substantially taut between the ground load and said hovering vehicle further includes the steps of electrically reducing the sensitivity of said indicator to variations in angular relationship of said vehicle about said first axis with respect to said flexible and extensible means as the length of said flexible and extensible means decreases during descent of said hovering vehicle and electrically reducing the sensitivity of said indicator to variations in the angular relationship of said vehicle about said second axis with respect to said flexible and extensible means as the length of said flexible and extensible means decreases during the descent of said hovering vehicle.

References Cited in the file of this patent

UNITED STATES PATENTS

| | | |
|---|---|---|
| 2,468,009 | Bigley | Apr. 19, 1949 |
| 2,692,120 | Cotton | Oct. 19, 1954 |
| 2,738,938 | Johnson | Mar. 20, 1956 |
| 3,059,590 | Feiler | Oct. 23, 1962 |
| 3,081,121 | Campbell | Mar. 12, 1963 |

OTHER REFERENCES

Aviation Week Magazine, June 6, 1963, page 61.